Figure 1:
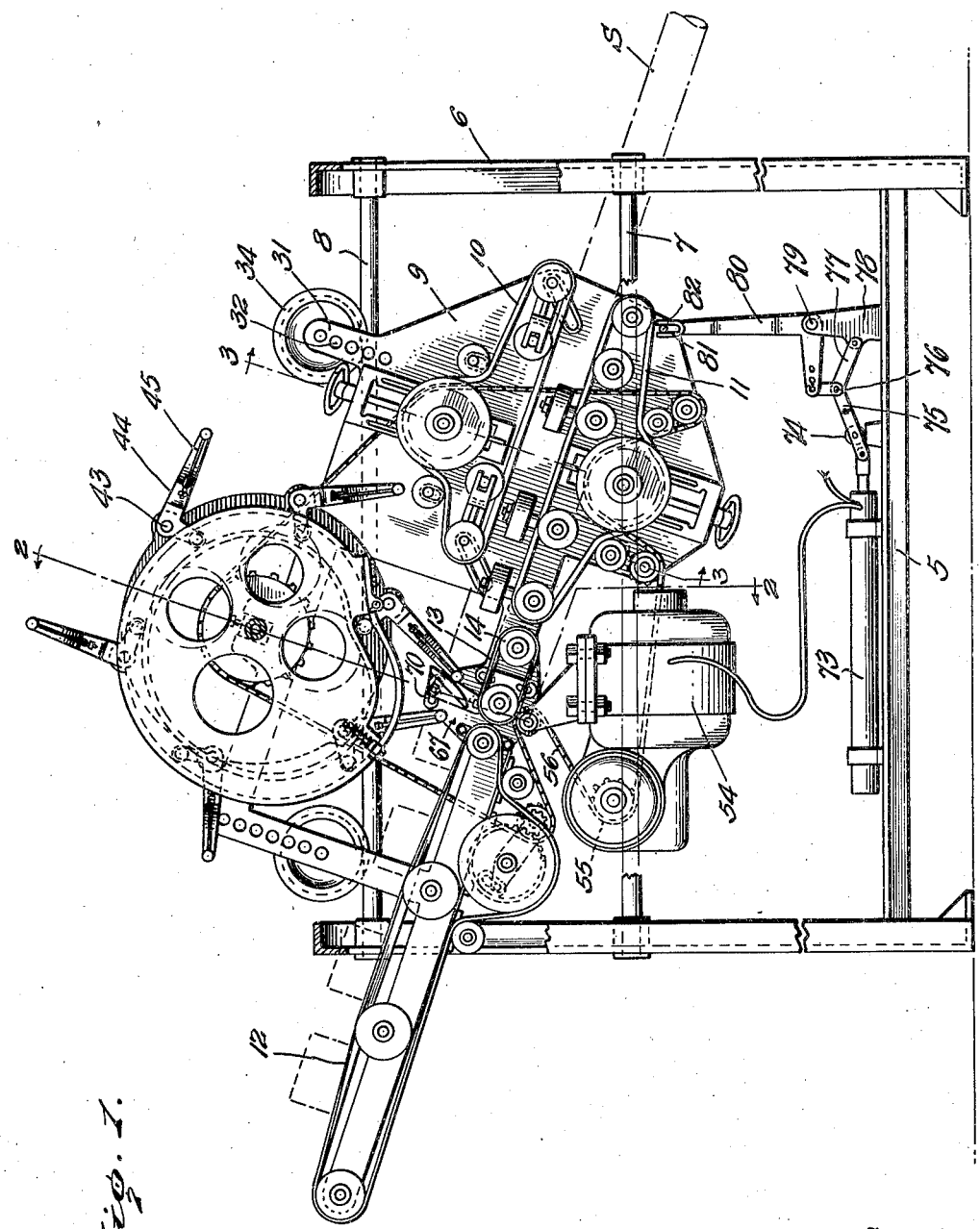

Nov. 8, 1938.  C. F. CARTER  2,136,001

MACHINE FOR CUTTING BARS OF SOAP AND OTHER PLASTIC MATERIAL

Filed July 28, 1937  5 Sheets-Sheet 1

Inventor
C. F. Carter.
By Lacey & Lacey, Attorneys

Nov. 8, 1938.                    C. F. CARTER                         2,136,001
         MACHINE FOR CUTTING BARS OF SOAP AND OTHER PLASTIC MATERIAL
                       Filed July 28, 1937          5 Sheets-Sheet 3

Fig. 3.

Inventor
C. F. Carter.

By Lacey & Lacey, Attorneys

Nov. 8, 1938.     C. F. CARTER     2,136,001
MACHINE FOR CUTTING BARS OF SOAP AND OTHER PLASTIC MATERIAL
Filed July 28, 1937     5 Sheets-Sheet 5

Inventor
C. F. Carter.
By Lacey & Lacey,
Attorney.

Patented Nov. 8, 1938

2,136,001

UNITED STATES PATENT OFFICE 2,136,001

MACHINE FOR CUTTING BARS OF SOAP AND OTHER PLASTIC MATERIAL

Clarence F. Carter, Danville, Ill.

Application July 28, 1937, Serial No. 156,206

18 Claims. (Cl. 25—110)

This invention relates to machines for cutting bars of plastic material and more particularly to a machine especially designed for use by soap manufacturers and others for cutting a continuous bar of soap into predetermined lengths preparatory to pressing or otherwise fashioning the same into individual cakes.

The object of the invention is to provide a machine of compact and efficient construction so designed as to take a continuous bar of soap or other plastic material directly from an extruding press or other source of supply and automatically cut or sever the bar into predetermined lengths suitable for cake soap, thereby obviating manual handling of the material and consequently effecting a material increase in production with a minimum consumption of time and labor.

A further object of the invention is to provide a soap bar cutting machine in which the speed of the conveyor belts and driving motor are automatically regulated to synchronize with the speed of travel of the bar of soap fed from the extruding press or other source of supply so that the cut or severed portions of the bar will be of uniform lengths irrespective of any fluctuation in the rate of discharge of material from said source of supply.

A further object of the invention is to provide means for manually adjusting the conveyor belts to change the surface speed thereof whereby the length of the cut or severed portions of the bar may be varied at will.

A further object is to provide a bar cutting machine including spaced belts or conveyors traveling at different speeds and an intermediate idle belt having a relatively narrow exposed surface or rib constituting an impact bed for the severing wires of the rotary cutting elements and which bed coacts with the cutters to effect a straight clean cut through the bar of soap or other plastic material at predetermined intervals.

A further object is to provide the machine with an adjustable cam disposed in the path of movement of the rotary cutting elements for guiding and directing the cutting members or wires thereof in a vertical plane through the bar of soap or other plastic material and further to provide yieldable means for holding the guide rollers of the cutting elements in engagement with the cam during the cutting or severing operation.

A further object is to provide a trip device operatively connected with the rheostat of the motor and actuated by the movement of the reciprocating carriage to automatically vary the speed of the motor.

A still further object of the invention is generally to improve this class of machines so as to increase their utility, durability and efficiency.

Figure 2:
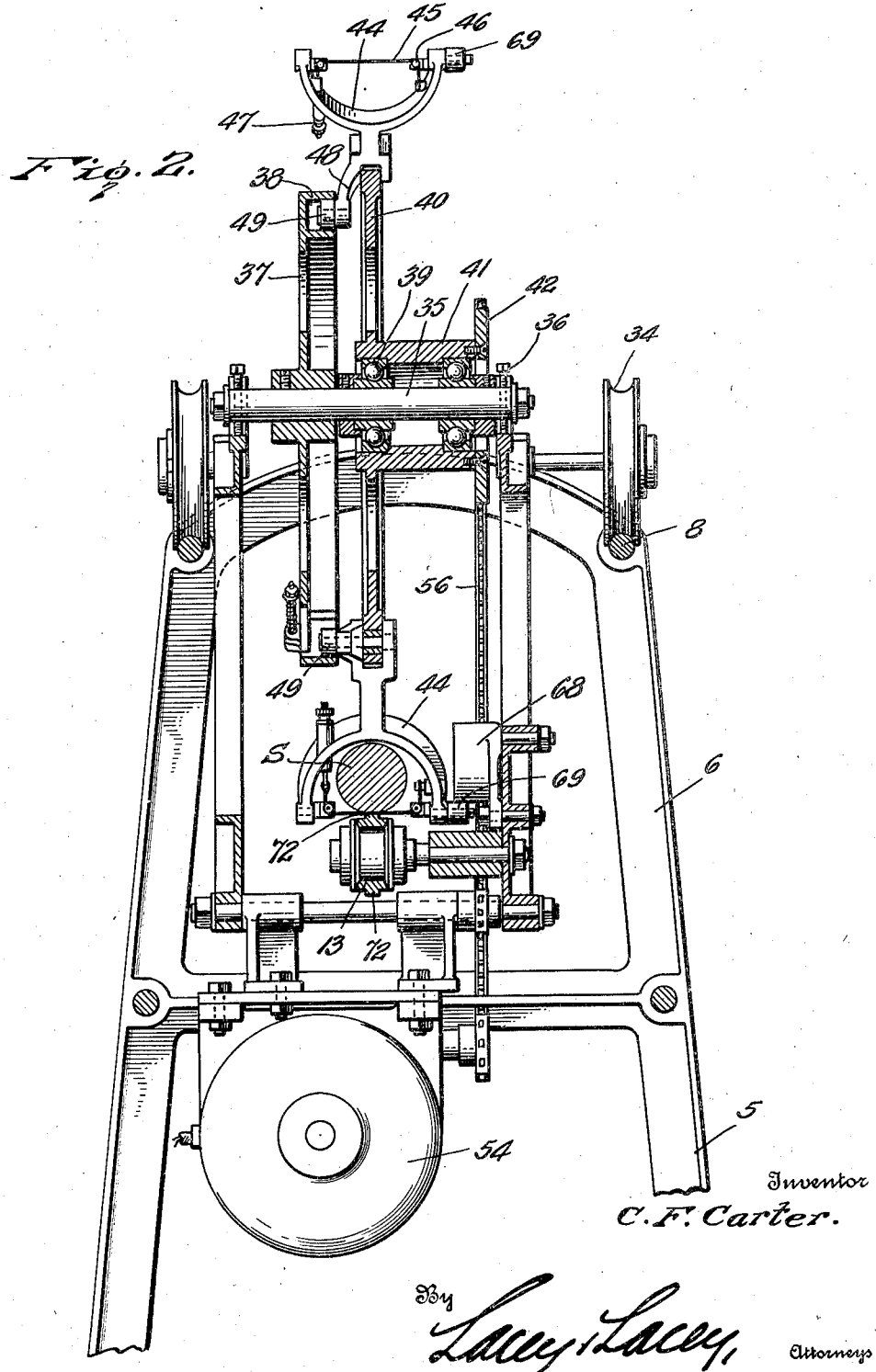
Figure 4:
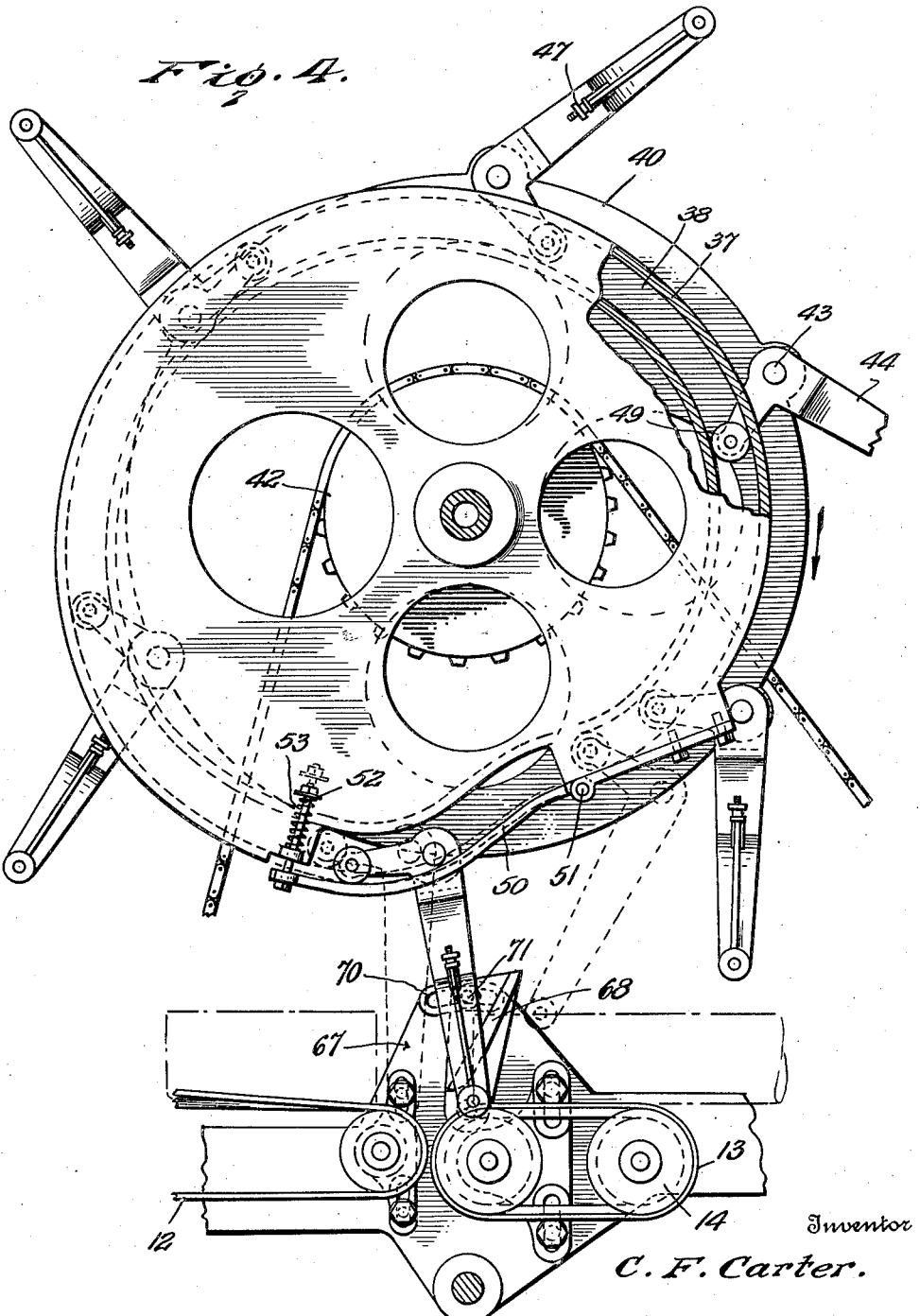
Figure 5:
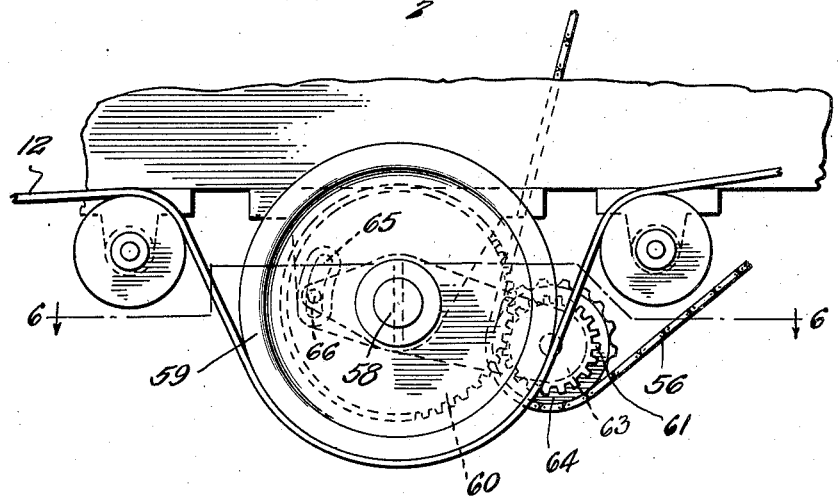
Figure 6:
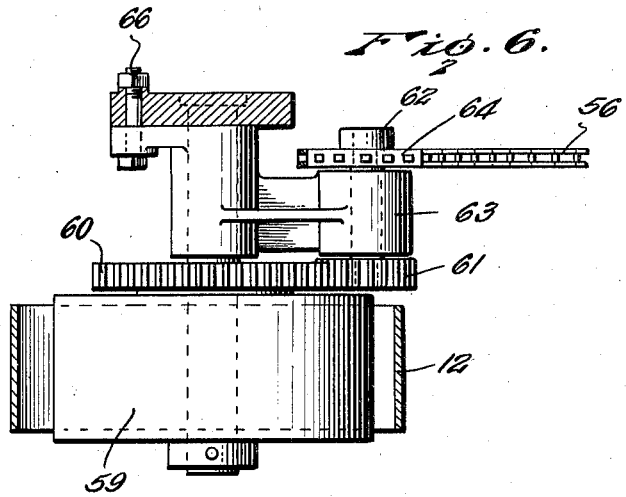
Figure 7:
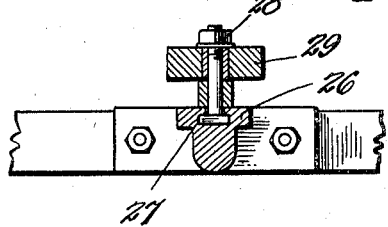

In the accompanying drawings forming a part of this specification and in which similar numerals of reference indicate corresponding parts in all the figures of the drawings:

Figure 1 is a side elevation of a soap bar cutting machine emboding the present invention, a portion of the supporting frame being cut away, Figure 2 is a vertical sectional view taken on the line 2—2 of Figure 1 and looking in the direction of the arrows, Figure 3 is a similar view taken on the line 3—3 of Figure 1 and looking in the direction of the arrows, Figure 4 is an enlarged view of the stationary cam, rotary cutting elements and associated parts, Figure 5 is an enlarged side elevation of the driving mechanism for the discharge belt or conveyor, Figure 6 is a horizontal sectional view taken on the line 6—6 of Figure 5, the driving pulley being shown in elevation, and Figure 7 is a vertical sectional view taken on the line 7—7 of Figure 3.

The improved bar cutting machine forming the subject-matter of the present invention comprises a supporting frame 5 including end members 6 connected by spaced upper and lower sets of tie rods 7 and 8, the upper set of tie rods constituting a track for a reciprocating carriage 9 on which is mounted the conveyor belts, rotary cutters, motor and associated parts. Disposed at the front of the carriage 9 are upper and lower coacting feed belts or conveyors 10 and 11 adapted to receive between them a continuous bar of soap or other plastic material, indicated at S. The bar of soap is ejected from an extruding press or other source of supply and during its passage through the machine is cut into predetermined lengths suitable for making cake soap. Arranged in advance of the feed belts or conveyors 10 and 11 is a discharge belt or conveyor 12 preferably disposed in longitudinal alinement with the feed belts and from which the cut or severed portions of the bar are ejected laterally in any suitable manner into a magazine adapted to receive the same. Interposed between the feed belts and discharge belt is an idle belt or conveyor 13 mounted for rotation on suitable pulleys 14 and this idle belt 13 is also preferably disposed in alinement with the feed and discharge belts, as best shown in Figure 1 of the drawings. Mounted on the frame of the carriage 9 are vertically adjustable suspension brackets 15 and 16 in which are mounted transverse shafts 17 carrying cone pulleys 18. Each cone pulley 18 is preferably formed in two sections, one of which is keyed or otherwise fixed to the adjacent shaft 17, as indicated at 19, while the other cone section is slidably mounted on the shaft and is normally and yieldably supported in engagement with the mating cone section by means of a coil spring 20 fitting over coacting sleeves 21 provided with terminal flanges 22 for engagement with said spring, the sleeves being retained in position on the shaft by forming a head 23 thereon, as shown. Threaded in the brackets 15 and 16 are adjusting screws 24 provided with hand wheels 25 by rotating which the brackets may be ajusted vertically of the carriage so as to adjust the feed belts towards or away from the shaft 17 to change the speed of travel of the feed belts and consequently vary the lengths of the cut or severed portions of the soap bar at will. The carriage 9 is provided with inwardly projecting ledges 26 having transverse slots 27 formed therein which receive vertical pins or bolts 28 on which are mounted for rotation rollers 29 adapted to contact with the soap and guide the same during its passage through the machine. By moving the bolts laterally within the slots 27 and tightening the nuts 30 the guide rollers 29 may be adjusted to accommodate any size soap bar. The frame of the carriage 9 is formed with upstanding extensions 31 having a series of openings 32 formed therein and adapted to receive stub safts 33 on which are mounted groove pulleys 34 which travel on the track 8, the rollers 34 serving to nicely balance the carriage on the track so that the carriage will move in response to any fluctuations in the rate of speed of the discharge of soap from the extruding machine, as will be more fully explained hereinafter.

Mounted on the carriage 9 immediately above the track 8 is a transverse shaft 35 held against rotation by clamping screws 36 and to which is keyed or otherwise rigidly secured a stationary member or disk 37 having one face thereof provided with a cam groove 38. Journaled in suitable roller bearings 39 on the shaft 35 is a rotary cutter wheel 40 and secured to the end of a sleeve 41 carried by the wheel 40 is a sprocket wheel 42.

Pivotally mounted at 43 on the periphery of the wheel 40 are a plurality of cutting elements each preferably in the form of a yoke 44, across the open end of which is stretched a cutting wire 45, one end of each wire being secured to one side of the yoke and thence extended over rollers 46 and through the adjacent wall at the other side of the yoke for attachment to an adjusting screw 47 whereby the wire may be kept under the desired tension. Each yoke 44 is provided with a relatively short arm 48 having a terminal roller 49 which fits within the cam groove 38 so that, as the wheel 40 rotates, the yokes 44 will be tilted on their pivotal axes and successively brought to a position to cause the wire 45 to cut or sever the bar of soap during its passage through the machine. The cam groove 38 is provided at the lower portion of the stationary member 37 with a yieldably supported section 50 pivotally connected at 51 to the member 37 and having its free end provided with a bolt 52 around which is fitted a compression spring 53, the purpose of which is to normally hold the pivoted section 50 to closed position or, in other words, in alinement with the adjacent wall of the cam groove. This spring 53 also serves to direct and guide the yokes during the cutting or severing operation, as will be more fully explained hereinafter. Mounted on the lower portion of the carriage is an electric motor 54 having a sprocket wheel 55 on the drive shaft thereof and around which is trained a sprocket chain 56. This sprocket chain 56 passes upwardly over the sprocket wheel 42 of the cutting member and thence extends downwardly and around sprocket wheels 57 on the transverse shafts 17 so that, when the motor is in operation, motion will be imparted simultaneously to the cutting elements and to the feed or discharge belts. Mounted for rotation on a stub shaft 58 disposed beneath the discharge belt 12 is a pulley 59 around which the discharge belt 12 travels and secured to the stub shaft 58 at the rear of the pulley 59 is a gear wheel 60 which meshes with a pinion 61. The pinion 61 is secured to a stub shaft 62 journaled in an adjustable bracket 63 and mounted on the inner end of the stub shaft 62 is a sprocket wheel 64 which receives the sprocket chain 56 of the motor. The bracket 63 is journaled on the stub shaft 58 and is provided with a segmental slot 65 through which passes a bolt 66 so that said bracket 63 may be adjusted to regulate the tension of the sprocket chain 56 to allow for adjustments of the brackets 15 and 16. Adjustably mounted on an extension 67 of the carriage and arranged at the outer end of the idle belt 13 is a cam 68, the purpose of which is to guide and direct the wires 46 of the cutting elements in a vertical plane through the bar of soap or other plastic material. Each cutting yoke 44 is provided with a contact member preferably in the form of a roller 69 which bears against the inclined face of the cam 68 and is yieldably supported in engagement therewith during the cutting operation by means of the spring 53 on the pivoted section of the cam groove. As soon as the roller 69 clears the lower end of the cam 68, the spring 53 will tend to exert an upward pull on the yoke and permit the rollers 49 of the yokes to continue their travel within the cam groove 38. The plate 67 is provided with a slot 70 through which the pivot bolt 71 of the cam passes so as to permit angular adjustment of the cam with respect to the feed belt 13. The belt 13 is provided with a relatively narrow upstanding rib 72 which constitutes an impact bed for engagement with the wires 45 of the cutting elements and thereby causes said wires to make a clean vertical cut through the bar of soap without forming a rough or ragged edge on the cut or severed portion of the soap.

Mounted on the frame beneath the motor is a rheostat or resistance element 73 having a contact member 74 slidably mounted therein and to which is pivotally connected a link 75 which link is, in turn, pivotally connected at 76 to a link 77 mounted on an upright 78. Pivotally connected at 79 on the upper end of the upright is a bell crank lever 80, the short arm of which is pivotally connected through the medium of a link with the levers 75 and 76 while the long arm thereof is bifurcated at 81 to receive a pin 82 extending laterally from the reciprocating carriage. The purpose of the lever 80 is to vary the speed of the conveyor belts 10 and 11 to synchronize with the speed of the bar of soap or other plastic material from the extruding machine. In other words, should the speed of travel of the soap bar ejected from the extruding machine exceed the speed of travel of the receiving belts, the bar of soap by contact with said conveyor belts and rollers 29 will tend to move the carriage forward on the tracks 8 and in doing so will cause the pin 81 to tilt the lever 80, thereby to reduce the resistance of the motor and consequently increase the speed of said motor so as to compensate for the increased speed of travel of the bar of soap. Conversely, should the bar of soap from the extruding machine travel slower than the speed of the receiving conveyors, the carriage will tend to move rearwardly on the tracks 8 and actuate the lever or trip device 80 to decrease the speed of the motor and consequently decrease the speed of the traveling conveyors.

The operation of the machine is as follows: Soap or other plastic material in bar form is continuously fed from an extruding machine or analogous device of any standard construction. As the bar of soap is ejected from the extruding machine, it will be received between the conveyors 10 and 11 and be carried forwardly over the idle belt 13. During the passage of the bar of soap through the machine, the rotary cutting elements are successively brought into contact with the bar of soap and the cutting wires of said elements directed downwardly by the cam 68 so as to cut or sever the bar of soap. As the cutters operate on the bar of soap to cut the latter into predetermined lengths, the rotation of the wheel 40 through the action of the cam grooves 38 will successively and automatically elevate the cutting elements out of contact with the soap so that the operation is continuous. The discharge belt 12 preferably travels at approximately two and one-half times the speed of the receiving belts or conveyors so that, as the bar of soap is cut into predetermined lengths suitable for cake soap, these cut or severed portions of the bar of soap may be quickly discharged laterally from the belt 12 by any suitable ejecting mechanism and deposited in a magazine for molding or shaping into the desired cake form. By manipulating the adjusting screws 25 of the brackets 15 and 16, the surface speed of travel of the belts 10 and 11 may be changed to effect a wide range of adjustments and consequently the bar of soap traveling through the machine may be cut into sections of any desired lengths.

While the machine is principally designed for cutting continuous bars of soap from an extruding machine or other source of supply, it will, of course, be understood that said machine may be used with equally good results for cutting any kind of plastic material, such as bars of butter, clay used in the formation of bricks, pipes, tubing and the like and for various other purposes, without departing from the spirit of the invention.

From the foregoing description, it is thought that the construction and operation of the machine will be fully understood by those skilled in the art and further description thereof is deemed unnecessary.

Having thus described the invention, what is claimed as new is:

1. A machine of the class described including a frame, a conveyor mounted for travel on the frame and adapted to receive a continuous bar of plastic material from a source of supply, means for synchronizing the speed of travel of the conveyor with the discharge of material from the source of supply, a guide cam, a cutting element disposed in the path of travel of the bar of plastic material for cutting the bar in predetermined lengths, a contact member carried by the cutter element, and means for directing the contact member in engagement with the guide cam during the cutting operation.

2. A machine of the class described including a frame, a conveyor mounted for travel on the frame and adapted to receive a continuous bar of plastic material from an extruding device, a guide cam disposed near the inner end of the conveyor, means for synchronizing the speed of travel of the conveyor with the discharge of material from the extruding device, a cutting element mounted for rotation above the conveyor for severing the bar of plastic material into predetermined lengths and provided with a roller, and means for yieldably forcing the roller into engagement with the guide cam during the cutting operation.

3. A machine of the class described including a frame, a carriage mounted for reciprocation on the frame, a conveyor mounted for travel on the carriage and adapted to receive a continuous bar of plastic material from a source of supply, means actuated by the passage of the bar of plastic material for reciprocating the carriage to synchronize the speed of travel of the conveyor with the discharge of plastic material from said source of supply and a cutter mounted on the carriage for severing the plastic bar into predetermined lengths.

4. A machine of the class described including a frame, a carriage mounted for reciprocation on the frame, spaced conveyors mounted on the carriage, one of which is adapted to receive a continuous bar of plastic material from an extruding device, an impact bed disposed between the spaced conveyors, a guide cam positioned at the impact bed, yokes mounted for rotation on the carriage and provided with contact members, cutting elements carried by the yokes for cutting the bar of plastic material into predetermined lengths, and means for directing the contact members into engagement with the guide cam during severance of the bar.

5. A device of the class described including a frame, a carriage mounted for reciprocation on the frame, spaced conveyors carried by the carriage, one of which is adapted to receive a continuous bar of plastic material from an extruding device and the other serving as a discharge device, an idle belt disposed between said conveyors, means for varying the speed of travel of the receiving conveyor, means responsive to the fluctuation in the discharge of plastic material from the extruding device for reciprocating the carriage to synchronize the speed of travel of the receiving conveyor with the discharge of the material from the extruding device, a guide cam disposed at the idle belt, and rotary cutters mounted on the carriage and movable into engagement with the guide cam for cutting the bar of plastic material into predetermined lengths.

6. A machine of the class described including a frame, a carriage mounted for reciprocation on the frame, coacting receiving belts mounted on the carriage and adapted to receive a bar of plastic material from an extruding device, a discharge belt, means for adjusting the receiving belts to vary the surface speed thereof, means responsive to the fluctuation of the discharge of material from the extruding device for reciprocating the carriage to synchronize the speed of travel of the receiving belts with the discharge of material from said extruding device, an impact bed disposed between the receiving and discharge belts, a guide cam disposed at the impact bed, and rotary cutting elements provided with contact members movable successively into engagement with the guide cam for cutting the bars into predetermined lengths.

7. A machine of the class described including a frame, a carriage mounted for reciprocation on the frame, a conveyor carried by the carriage and adapted to receive a bar of plastic material from an extruding device, a motor for operating the conveyor and including a rheostat, cutters operable by the motor for cutting the bar of plastic material into predetermined lengths, and a trip device operatively connected with the rheostat and actuated by the movement of the carriage to vary the speed of the motor upon fluctuation of the discharge of plastic material from said extruding device.

8. A machine of the class described including a frame, a carriage mounted for travel on the frame, a conveyor movable with the carriage and adapted to receive a bar of plastic material from a source of supply, a motor for operating the conveyor, a rheostat connected with the motor, means operable by the motor for cutting the bar of plastic material into predetermined lengths, and a trip device operatively connected with the rheostat and actuated by the carriage to automatically synchronize the speed of the motor with the travel of the plastic material discharged from the source of supply.

9. A machine of the class described including a frame, a carriage mounted for reciprocation on the frame, a plurality of conveyors mounted on the carriage, one of which is adapted to receive a bar of plastic material from an extruding device, cutting elements mounted on the carriage for automatically cutting the bar of plastic material into predetermined lengths, a motor for operating the conveyor and cutting elements, and means actuated by the carriage and responsive to variations in the rate of discharge of the plastic bar from the extruding device for regulating the speed of the motor.

10. A machine of the class described including a frame, a carriage mounted for travel on the frame, receiving and discharging conveyors on the carriage, one of which is adapted to receive a bar of plastic material from an extruding device, an idle belt disposed between the conveyors and provided with an upstanding circumscribing rib constituting an impact bed, a stationary member on the carriage provided with a cam groove, and rotary cutting elements having arms operating in the cam groove and provided with transverse wires coacting with the impact bed for cutting the bar of plastic material into predetermined lengths.

11. A machine of the class described including a frame, a carriage mounted for reciprocation on the frame, adjustable brackets carried by the carriage, stub shafts journaled in the brackets, sectional cone pulleys mounted on the stub shafts, conveyor belts trained around said pulleys and adapted to receive between them a continuous bar of plastic material from a source of supply, cutters mounted for rotation on the carriage for cutting the bar of plastic material into predetermined lengths, means for operating the conveyor belts and cutters, and means for discharging the cut portions of the bar.

12. A machine of the class described including a frame, a carriage mounted for reciprocation on the frame, adjustable brackets carried by the frame, stub shafts journaled in said brackets, sectional cone pulleys mounted on the stub shafts and adapted to receive endles conveyor belts, one section of each cone pulley being yieldably supported in contact with the mating section, means for adjusting the brackets vertically of the carriage to move the conveyor belts towards or away from the stub shafts, cutters mounted for rotation on the carriage and adapted to cut a bar of plastic material in predetermined lengths, and a motor operatively connected with the rotary cutters and conveyor belts respectively.

13. A machine of the class described including a frame, a carriage mounted for reciprocation on the frame and provided with inwardly extending ledges, coacting brackets adjustable vertically of the carriage, stub shafts carried by the brackets and provided with sectional pulleys, the inner faces of the pulley sections being beveled and one section of each pulley being yieldably supported in contact with the adjacent section, conveyor belts trained around said pulleys and adapted to receive a continuous bar of plastic material from an extruding device, guide rollers mounted for rotation on the supporting ledge of the carriage for contact with the bar of plastic material, rotary cutters mounted on the carriage, a motor for driving the cutters and conveyors, a rheostat connected with the motor, and a trip device connected with the rheostat and operable by engagement with the carriage for varying the speed of the motor.

14. A machine of the class described including a frame, a conveyor mounted on the frame and adapted to receive a continuous bar of plastic material from an extruding device, a stationary shaft mounted on the frame, a stationary member secured to the shaft and provided with a cam groove, a wheel mounted for rotation on the shaft, yokes pivotally mounted on the wheel and provided with arms terminating in rollers operating in the cam groove, a cutting wire carried by each yoke, means for adjusting the tension of the wires, an adjustable guide cam disposed adjacent the conveyor, a roller carried by each yoke and movable into engagement with said guide cam, and a motor operatively connected with the yoke carrying wheel and said conveyor.

15. A machine of the class described including a frame, coacting conveyors mounted for travel on the frame and adapted to receive between them a continuous bar of plastic material from an extruding device, a stationary shaft extending transversely of the frame, a stationary member secured to said shaft and provided with a cam groove including a yieldably supported pivoted section, a wheel mounted for rotation on the stationary shaft, yokes pivotally mounted on the wheel and provided with relatively short arms having terminal rollers operating in the cam groove, cutting elements carried by the yokes, a guide cam disposed in front of the conveyors, a motor for rotating said wheels and conveyors, and rollers carried by the yokes and movable into engagement with said guide cam under the influence of the yieldably supported pivoted section of said stationary member.

16. A machine of the class described including a frame, a carriage mounted for reciprocation on the frame, an endless conveyor mounted for rotation on the carriage, a stationary member carried by the carriage and provided with a cam groove, a rotating member, yokes pivotally mounted on the rotating member and provided with relatively short arms terminating in rollers operating in the cam groove, cutting wires extending across the yokes, means for adjusting the tension of said cutting wires, a pivoted section forming a portion of the wall of the cam groove, a spring connecting the pivoted section with the stationary member, a guide cam disposed beneath the pivoted section, a roller carried by the free end of each yoke and movable into engagement with the cam under the influence of the spring of said pivoted section, and means for rotating the conveyor and yokes respectively.

17. A machine of the class described including a frame, tracks carried by the frame, a carriage mounted for reciprocation on said tracks, coacting conveyors mounted on the carriage and adapted to receive between them a continuous bar of plastic material from an extruding device, a discharge conveyor, an idle belt interposed between the first-mentioned conveyors of the discharge conveyor and provided with an upstanding rib, a stationary member mounted on the carriage and provided with a cam groove, a rotating member, yokes pivotally mounted on the rotating member and provided with short arms having rollers thereon operating in the cam groove, cutting elements carried by the yokes, an adjustable guide cam disposed in advance of the idle belt, rollers carried by the outer ends of the yokes and movable successively into engagement with the guide cam for forcing the cutting elements in a vertical path through the bar of plastic material and in contact with the rib of the idle belt, a motor, means for transmitting motion from the motor to the conveyors and yokes, a rheostat operatively connected with the motor, a trip device connected with the rheostat, and means mounted on the carriage and adapted to engage the trip device for automatically varying the speed of the motor.

18. A machine of the class described including a frame, a carriage mounted for reciprocation on the frame, coacting endless conveyors mounted on the carriage and adapted to receive a bar of plastic material between them, cutters mounted for rotation on the carriage for cutting the bar into predetermined lengths, means for varying the surface speed of the conveyors, a motor for driving the conveyors and rotary cutters, a resistance element operatively connected with the motor, a bell crank lever pivotally mounted on the frame, a link connection between the short arm of the bell crank lever and the resistance element, the long arm of the bell crank lever being bifurcated, and a pin extending laterally from the carriage and operating in the bifurcated end of the bell crank lever, said lever being actuated by the movement of the carriage to increase or decrease the resistance of the motor and thereby vary the speed of said motor.

CLARENCE F. CARTER.